Dec. 4, 1962  F. W. LINDBLOM  3,066,574
TEMPLE HINGE MOUNTING
Filed July 1, 1960

INVENTOR.
FRANK W. LINDBLOM
BY
Barlow & Barlow
ATTORNEYS

United States Patent Office 3,066,574
Patented Dec. 4, 1962

3,066,574
TEMPLE HINGE MOUNTING
Frank W. Lindblom, Warwick, R.I., assignor to Welsh Manufacturing Company, a corporation of Rhode Island
Filed July 1, 1960, Ser. No. 40,327
1 Claim. (Cl. 88—53)

This invention relates to a spectacle in which use is made of a non metallic rim member which extends to provide an end piece for mounting a temple.

In the mounting of a hinge or one of the members of a hinge of a spectacle temple, this hinge is usually mounted upon some plate which extends along the rear surface of the non metallic end piece and is riveted to this end piece by rivets extending through the end piece. A temple hinge so mounted is not particularly secure due to the non rigidity of the non metallic end piece in which it is mounted.

One of the objects of this invention is to provide a more secure and firm mounting for the temple hinge than has heretofore been done with non metallic end pieces.

Another object of the invention is to provide a simple and secure mounting for the temple hinge.

With these and other objects in view, the invention consists of certain novel features of construction as will be more fully described and particularly pointed out in the appended claim.

Figure 1:
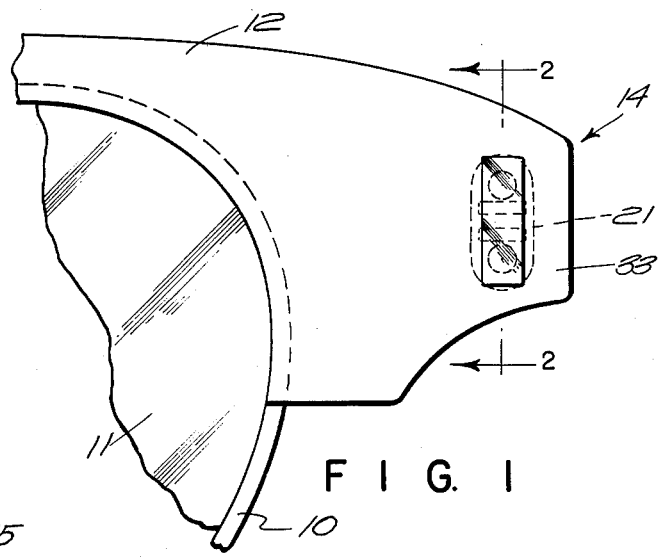
FIG. 1 is a fragmental elevation illustrating the front portion of a non metallic end piece and its association with the lens and rim and illustrating the improved mounting which is the subject of this invention.
Figure 4:
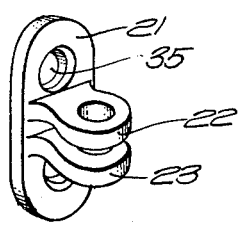
FIG. 4 is a perspective view of one part of the temple hinge.
Figure 2:
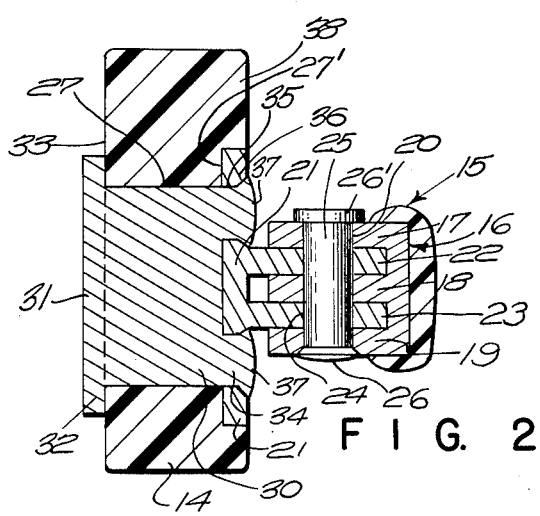
FIG. 2 is a sectional view on lines 2—2 of FIG. 1.

In proceeding with this invention, I set into the non metallic end piece a metal block which will present its rear surface for attachment of a member of the metal temple hinge and then rivet this member of the temple hinge in face to face contact with this metal block so that the strength of an all metal mounting for the temple hinge is provided.

With reference to the drawings 10 designates a metallic rim for a lens 11 which has a non metallic rim member 12 recessed to receive the rim 10 for mounting thereon. This non metallic rim member extends at its opposite ends to provide end pieces 14 projecting beyond but in substantially the plane of the lenses to provide a mounting for a temple.

The temple 15 is provided at its forward end with a hinge which comprises two members. One of these members 16 is fixed to the temple and is here shown as having a plate with three leaves 17, 18 and 19 extending therefrom, each of which is provided with an opening 20 which openings are in registry. The other member of the hinge comprises a plate 21 which has hinge leaves 22 and 23 extending from its surface which leaves are each provided with an opening 24 which register with each other and also are in registry with the openings 20 in the leaves of the member 16 so as to receive the pintle pin or rivet 25 therethrough, the same being headed as at 26 and 26' so as to prevent escape and provide the hinge connection between the parts 16 and 21.

Figure 3:
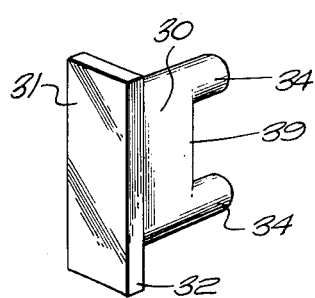
FIG. 3 is a perspective view of the metallic block which plays an important part in the subject of this invention.

The end piece 14 is provided with a recess 27' in its rear surface 38 and an opening 27 therethrough intersecting this recess and in this opening there is positioned a solid metal block 30 (see FIG. 3). At the front or forward end of this block, there is a plate 31 of a size larger than the block 30 so as to in effect provide flanges 32 which extend over the front face 33 of the end piece. Rivets or protrusions 34 extend from the rear end of the block 30.

The plate 21 has an area greater than the end of the block 30 and of a size and shape to fit recess 27' and is provided with holes 35 to closely receive the rivets 34 which holes are enlarged as at 36 so that when the rivet is headed over as at 37 it will fill this chamfered or enlarged portion 36 of the opening 35.

The plate 21 is set into recess 27' in the rear surface 38 of the end piece 14 so that it will be substantially flush with the surface 38 and so that it will have its face nearest the block 30 in direct contact with the abutting rear surface 39 of this metal block so as to provide a direct and metal to metal abutting contact support for the hinge member which is mounted on the end piece 14.

In this manner a very secure mounting for the temple hinge is provided and one which by reason of the area of the block provides a very secure mounting in the end piece.

I claim:

In a spectacle, a nonmetallic frame end piece having front and rear surfaces, a one-piece metallic block set into said end piece and of a thickness to extend substantially through said end piece and present a metallic rear abutting surface generally parallel to the rear surface of the end piece and adjacent the rear surface of the end piece, a face plate fixed to the forward end of the block extending over the front surface of the end piece, a temple hinge metallic member comprising a plate set into the end piece as so to be flush with the rear surface thereof and engaging said rear abutting surface and means comprising rivets formed as one piece with the block extending through said plate to secure said hinge member and block in direct metal to metal contact.

References Cited in the file of this patent

UNITED STATES PATENTS

| 1,650,576 | Welsh | Nov. 22, 1927 |
| 2,474,119 | Rohrbach | June 21, 1949 |
| 2,748,654 | Rohrbach et al. | June 5, 1956 |
| 2,803,994 | Angelis et al. | Aug. 27, 1957 |

FOREIGN PATENTS

| 710,576 | France | June 8, 1931 |
| 870,078 | France | Dec. 5, 1941 |
| 870,590 | France | Dec. 22, 1941 |